Patented Feb. 21, 1928.

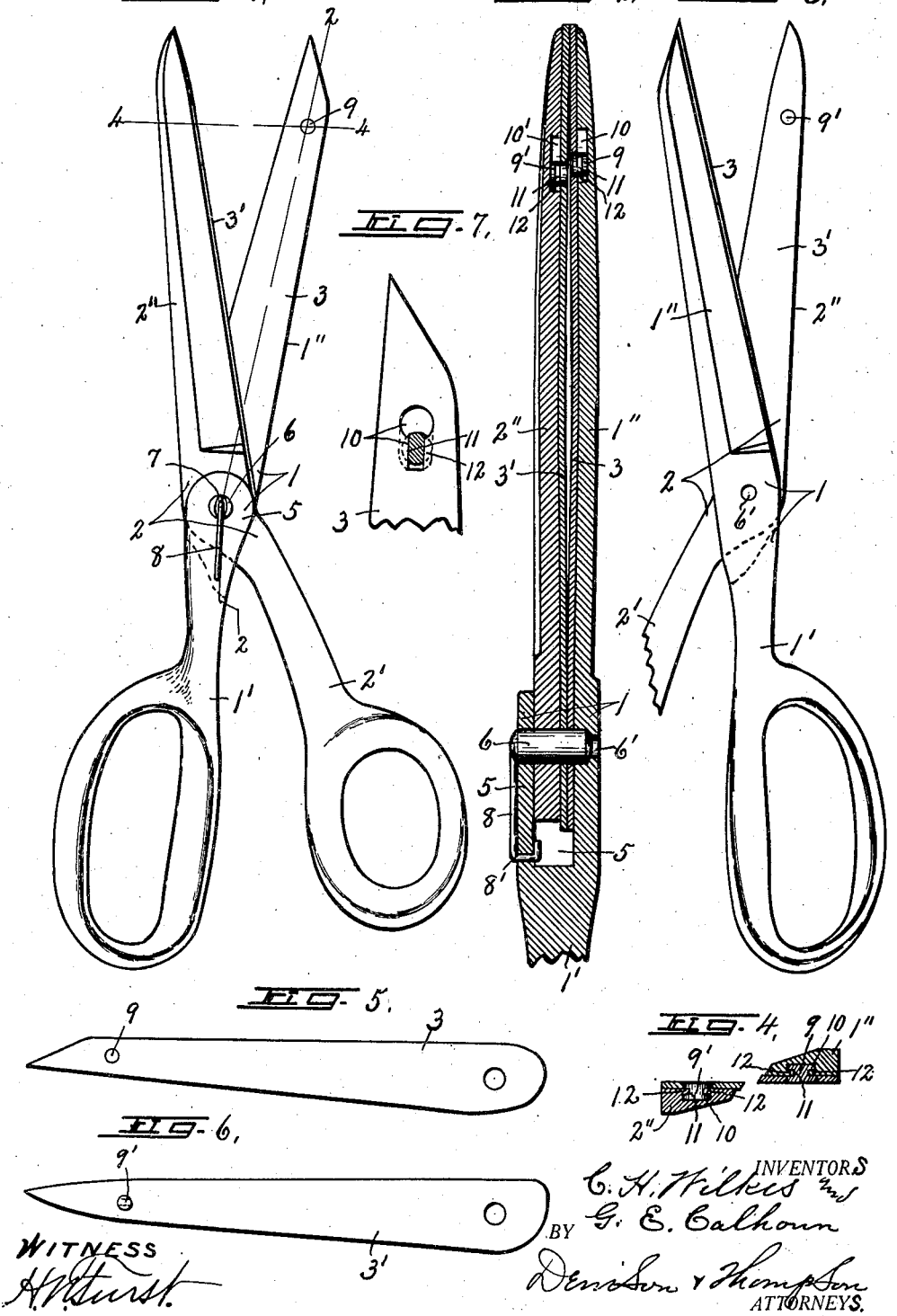

1,660,286

UNITED STATES PATENT OFFICE.

CLARENCE H. WILKES AND GEORGE E. CALHOUN, OF AMSTERDAM, NEW YORK, ASSIGNORS TO A-KEE-NA PRODUCTS COMPANY, INCORPORATED, OF AMSTERDAM, NEW YORK, A CORPORATION OF DELAWARE.

SHEARS.

Application filed October 19, 1926. Serial No. 142,617.

This invention relates to shears of the class set forth in our pending application Serial No. 32,911, filed May 26, 1925, in that the shearing blades are removably mounted upon the adjacent faces of a pair of intersecting levers to overlap at the intersection and together with the levers are pivotally connected by a pivotal pin at the intersection.

In our pending application referred to one of the levers is provided with an integral extension between the handles to overlap upon the outer face of the other lever for holding the levers with the removable blades thereon in shearing position.

This interposition of the extension between the handles of the levers while efficient for the purpose of maintaining shearing relation between the blades necessitates the offsetting of the handle ends of both levers mainly to one side of a direct line passing through the longitudinal center of the blade which makes the width of the shears near the intersection of the levers greater than is desirable and one of the objects of the present invention is to bring the handle of the lever having the extension together with said extension in more nearly a direct line passing through the longitudinal center of the blade of that particular lever so as to reduce the width of the shears at the intersection of the levers to approximately the width of one of the blades at said intersection.

Another object is to provide the interlocking connections between the removable blades and levers with means for firmly holding said blades against movement relatively to their respective levers when adjusted for use and at the same time to enable the blades to be more easily and quickly attached and detached to and from said levers than has heretofore been practised.

Other objects and uses relating to specific parts of the shears will be brought out in the following description.

In the drawings:—

Figure 1 is a plan of a pair of shears embodying the features of our invention.

Figure 2 is an enlarged longitudinal sectional view of a portion of the same shears taken on line 2—2, Figure 1, except that the shears are closed.

Figure 3 is an inverted plan of the same shears showing a portion of one of the handles broken away.

Figure 4 is an enlarged transverse sectional view taken on line 4—4, Figure 1.

Figures 5 and 6 are plans of the detached shearing blades.

Figure 7 is an enlarged face view of the outer end of one of the shearing blades showing in section one of the studs for locking it to the corresponding lever.

As illustrated, the shears comprises a pair of levers —1— and —2— crossing each other some distance from their ends to form handle portions —1'— and —2'— at one end and blade supporting arms —1"— and —2"—, the latter serving to receive and support a pair of shearing blades —3— and —3'—.

The levers —1— are of approximately equal length while the shearing blades —3— and —3'—, extend from the points of the arms —1"— and —2"— a short distance beyond the intersection of the levers so as to overlap one upon the other between the levers at said intersection.

The lever —1— is provided with a relatively short arm or extension —5— integrally united thereto at the rear of the intersection of the levers and extending forwardly therefrom across said intersection to overlap upon the outer face of the adjacent portion of the other lever —2— thereby forming a lengthwise slot —5'— for receiving the adjacent portions of the lever —2— and blades —3— and —3'—.

The intersecting portions of the levers —1— and —2— and adjacent ends of the blades —3— and —3'— together with the extension arm —5— are provided with registering openings for receiving a pivotal pin —6— of substantially the same diameter as the openings so as to form a reasonably tight joint therewith.

The outer end as —6'— of the pivot opening in the lever —1— is slightly reduced to prevent the passage of the pivotal pin —6— therethrough while the opposite end of the pivotal pin projects slightly beyond the outer face of the extension arm —5— and is provided with a transverse groove —7— for receiving a spring detent —8—, the latter being pivotally attached at one end to the adjacent portion of the lever —1— some distance to the rear of the pivot —6— and having its outer end spring-pressed into the slot —7— for holding the pivotal pin in operative position when adjusted for use, said detent being movable about its pivot as —8'— to release the pin when it is desired to withdraw the same.

The handles —1'— and arms —1''— of the lever —1— are alined with each other so that their longitudinal centers are substantially co-incident and pass through the axis of the pivotal pin —6— and, therefore, the extension arm —5— while in substantially the same straight line thus permitting this portion of the shears to be reduced in width to about the width of the adjacent portion of either of the blades.

The handle portion —2'— of the lever —2— is offset outwardly beyond the longitudinal center of the arm —2''— and forms an angle with said arm at the intersection so as to allow its intersecting portion to overlap upon the adjacent portion of the other lever —1— for receiving the pivotal pin —6—.

The transverse depth of the slot —5'— is substantially equal to the combined thickness of the portions of the lever —2— and blades —3— and —3'— which enter the slot so that the opposite walls of the slot may serve to frictionally hold the shearing blades in contact with each other and with their supporting arms.

The levers —1— and —2— may be made of cast metal or cheaper grades of steel than the shearing blades and when so made the extension arm —5— may be pressed toward the opposite side of the lever —1— sufficiently to exert resilient pressure upon the adjacent portions of the lever —2— and blades —3— and —3'— toward the opposite portion of the lever —1— to frictionally hold the blades and their supporting arms in contact with each other and to take up wear incidental to the operation of the levers and blades about the axis of the pivot —6—.

It is now clear that the pivotal pin —6— serves not only as a means for pivoting the levers and shearing blades to each other, but also serves to hold the shearing blades against radial movement relatively to the axis of movement of the levers.

It is necessary, however, to provide additional means for holding the shearing blades against relative turning movement on their respective levers and at the same time to permit said blades to be easily and quickly removed from said levers when the pivotal pin —6— is withdrawn.

As illustrated, this means comprises a pair of studs —9— and —9'— riveted to its corresponding blade near the outer end thereof in such manner that the inner faces of the studs are co-incident with the corresponding faces of the blades as shown in Figures 2 and 4.

The arms —1''— and —2''— of the levers —1— and —2— are provided in their inner faces with elongated recesses —10— and —10'— into which the outer ends of the adjacent studs —9— and —9'— are adapted to project respectively.

The depth of the recesses —10— and —10'— is less than the thickness of the adjacent portions of the levers —1— and —2— so that the outer portions of the levers are continuous across the recesses.

The studs —9— and —9'— project outwardly beyond the corresponding blades —3— and —3'— a distance corresponding to the depth of the recesses —10— 10'— and each stud is provided with diametrically opposite peripheral grooves —11— substantially parallel with the longitudinal center of its corresponding blade for receiving lengthwise ribs —12— on opposite walls of the corresponding recesses —10— and —10'— as shown more clearly in Figure 4.

The front ends of the recesses —10— and —10'— are of sufficient size to permit the passage of the studs —9— and —9'— thereinto and are preferably formed without ribs which are located in opposite sides of the rear portions of the recesses a distance from the pivotal openings in the lever —1— and —2— corresponding approximately to the distance between the pivotal openings in the blades —3— and —3'— and their respective studs —9— and —9'—.

In placing the shearing blades upon their respective levers for use before the pivotal pin —6— is inserted in the registering openings in the blades and levers the studs —9— and —9'— are inserted in their corresponding openings —10— and —10'— and the blades are then drawn rearwardly to cause the ribs —12— to enter the grooves —11— until the pivotal openings in said blades are registered with the pivotal openings in their corresponding levers.

The lever —2— with its blade —3'— is then inserted in the open end of the slot —5— to register its pivotal opening with that of the lever —1— whereupon the pivotal pin —6— is inserted in the registering openings and locked in place by the adjustment of the detent —8— thereby holding the blades —3— and —3'— in operative position with their lugs —9— and —9'— interlocked with the ribs —12—.

The flat walls of the grooves —11— engage the inner straight edges of the ribs —12— shown in Figure 7 and firmly holds the blades against turning movement about the axis of the pivotal pin —6—.

In order to remove the blades it is simply necessary to spring the detent —8— out of engagement with the pivotal pin —6— and move it to one side whereupon the pivotal pin may be driven out by the application of a suitable tool through the reduced opening —6'²— thus permitting the removal of the lever —2— with the blade —3'— thereon whereupon both blades may be moved forwardly to register their respective studs at —9— and —9'— with the corresponding openings —10— and —10'— when they may be withdrawn laterally from the levers.

What we claim is:—

In a shears, a pair of levers crossing each other, one of said levers having a lengthwise slot at the crossing in which the other lever is inserted, shearing blades seated against adjacent faces of the levers and extending into said slot, the opposite walls of the slot and adjacent ends of the shearing blades being provided with registering openings, a pivotal pin inserted in said openings, said levers being provided with recesses in their adjacent faces near their front ends, only part way therethrough, the front ends of the open sides of the recesses being wider than their rear ends, and the opposite walls of the narrower ends under cut, and locking members on the shear blades projecting outwardly therefrom and having their outer ends adapted to enter the larger ends of the recesses and provided with grooves in opposite sides thereof for receiving the walls of the narrower portions of the recesses by rearward sliding movement of the shearing blades on the levers.

In witness whereof we have hereunto set our hands this 7th day of October 1926.

CLARENCE H. WILKES.
GEORGE E. CALHOUN.